(12) United States Patent
Bartoli et al.

(10) Patent No.: US 9,649,807 B2
(45) Date of Patent: May 16, 2017

(54) APPARATUS FOR FORMING AND LABELING AN OBJECT AND OBJECT SO OBTAINED

(75) Inventors: Andrea Bartoli, Reggio Emilia (IT); Flavio Traldi, San Prospero (IT); Elio Sanibondi, Reggio Emilia (IT)

(73) Assignee: Sarong Societa'per Azioni (IT)

( * ) Notice: Subject to any disclaimer, the term of this patent is extended or adjusted under 35 U.S.C. 154(b) by 735 days.

(21) Appl. No.: 13/577,525

(22) PCT Filed: Feb. 8, 2011

(86) PCT No.: PCT/IB2011/000209
§ 371 (c)(1),
(2), (4) Date: Nov. 5, 2012

(87) PCT Pub. No.: WO2011/098886
PCT Pub. Date: Aug. 18, 2011

(65) Prior Publication Data
US 2013/0043151 A1  Feb. 21, 2013

(30) Foreign Application Priority Data
Feb. 9, 2010 (IT) .............................. MO2010A0024

(51) Int. Cl.
*B29C 51/16* (2006.01)
*B65D 77/24* (2006.01)
(Continued)

(52) U.S. Cl.
CPC .......... *B29C 51/167* (2013.01); *B65D 77/245* (2013.01); *B29C 51/082* (2013.01);
(Continued)

(58) Field of Classification Search
USPC ............................................ 493/84
See application file for complete search history.

(56) References Cited

U.S. PATENT DOCUMENTS

| 4,394,115 A | 7/1983 | Dronet |
| 5,604,006 A * | 2/1997 | Ponchaud et al. .............. 428/67 |

(Continued)

FOREIGN PATENT DOCUMENTS

| DE | 1704091 A1 | 5/1971 |
| DE | 10011386 A1 | 9/2000 |

(Continued)

*Primary Examiner* — Michelle Lopez
*Assistant Examiner* — Chinyere Rushing-Tucker
(74) *Attorney, Agent, or Firm* — Laubscher, Spendlove & Laubscher, P.C.

(57) ABSTRACT

An apparatus for forming objects, in particular containers, and for applying respective labels thereto, includes a forming arrangement provided with a punch cooperating with a cavity of a die to make the objects by forming a sheet of thermoformable material. The cavity includes a first wall element and second walls. The first wall element is movable between a first operating position in which it receives a label and a second operating position in which it bounds the cavity in cooperation with the second walls, and supports the label in such a manner that during a subsequent forming operation the label is fixed to, in particular substantially incorporated in, the object.

6 Claims, 10 Drawing Sheets (51) Int. Cl.
　　　*B29C 51/08*　　　(2006.01)
　　　*B29C 51/42*　　　(2006.01)
　　　*B29C 51/44*　　　(2006.01)
　　　*B29C 49/24*　　　(2006.01)
　　　*B29L 31/00*　　　(2006.01)

(52) U.S. Cl.
　　　CPC .......... *B29C 51/428* (2013.01); *B29C 51/445* (2013.01); *B29C 2049/2439* (2013.01); *B29C 2791/007* (2013.01); *B29L 2031/7132* (2013.01)

(56) References Cited

U.S. PATENT DOCUMENTS

| | | | | |
|---|---|---|---|---|
| 5,606,847 | A | * | 3/1997 | Joensson ................. B65B 7/164 53/268 |
| 5,729,963 | A | * | 3/1998 | Bird ............................ 53/471 |
| 6,412,653 | B1 | * | 7/2002 | Waterhouse ................ 220/556 |
| 7,323,990 | B2 | * | 1/2008 | Urban ...................... 340/572.1 |
| 2009/0294454 | A1 | * | 12/2009 | Harding .................... 220/574.1 |

FOREIGN PATENT DOCUMENTS

| | | | |
|---|---|---|---|
| DE | 202004012669 | U1 | 12/2005 |
| DE | 202004012669 | U1 * | 1/2006 |
| DE | 10011386 | B4 * | 4/2009 |
| EP | 0265599 | A2 | 5/1988 |
| WO | 2004085288 | A2 | 10/2004 |
| WO | 2006091127 | A2 | 8/2006 |

\* cited by examiner

APPARATUS FOR FORMING AND LABELING AN OBJECT AND OBJECT SO OBTAINED

This application is a §371 National Stage entry of PCT International Application No. PCT/IB2011/000209 filed Feb. 8, 2011. PCT/IB2011/000209 claims priority to IT Application No. MO2010A000024 filed Feb. 9, 2010. The entire contents of these applications are incorporated herein by reference.

BACKGROUND OF THE INVENTION

The invention relates to an apparatus for making objects, in particular containers, by forming a sheet of thermoformable material and for applying a label to the aforesaid containers. The invention further relates to an object, in particular a container, obtained by the aforesaid apparatus. Thermoforming machines are known that are arranged for forming containers from a sheet of thermoformable material comprising a plurality of apparatuses, amongst which a labelling apparatus.

The plurality of apparatuses is arranged in succession along an advancement direction of the sheet. The latter is suitably heated before reaching a forming apparatus, where it is thermoformed by a punch cooperating with a die.

The plurality of apparatuses also comprises in succession a dosing apparatus for filling the thermoformed container with a product and a welding apparatus for welding a covering film to the container such as to seal the container. Thermoforming machines lastly comprise a shearing apparatus for separating the containers so formed, filled and sealed from the sheet of material.

The labelling apparatus, which includes, for example, a labelling machine of known type, is generally positioned downstream of the forming apparatus or downstream of the welding apparatus and applies by gluing a label to a surface of the container.

A drawback of known thermoforming machines consists of the difficulty of positioning and applying with the necessary precision the labels to the containers, because of the clearances and the imprecision in moving sheet material from one apparatus to another.

Incorrect and/or imprecise positioning of the label can give the container an unattractive appearance.

A further drawback of known machines consists of the presence of residues of glue used to apply the label to the container, for example residues exceeding from the margins of the label, which may dirty the surface of the container and parts and components of the machine. Also in this case, the glue residue compromise the final aesthetic appearance of the container.

Thermoforming machines provided with a labelling apparatus are moreover costly. In particular, in addition to the cost of the labelling apparatus, which may also be very great in proportion to the complexity thereof, the cost of the glue has to be sustained that is necessary for fixing the label to the container.

It should be considered that sometimes forming machines have to be able to form containers provided with an object, such as, for example, a spatula or spoon that the user can use to draw the product from the container, said object being generally interposed between the surface of the container to which the label is applied and the label itself.

As the object is arranged for drawing the product (which is generally a food product), it is necessary for the object not to come into contact with the glue. In order to do so, the glue has to be distributed only in certain peripheral portions.

A drawback of these machines is due to the difficulty of applying the label by effective gluing that however enables the object not to be dirtied with the glue.

SUMMARY OF THE INVENTION

An object of the invention is to improve known machines for making objects, for example containers, by forming a sheet of thermoformable material. In particular, one object of the invention is to provide a forming and labelling apparatus that is usable in said thermoforming machines.

A further object of the invention is to provide a forming and labelling apparatus that is simple and cheap and at the same time precise and reliable.

Another object is to provide a forming and labelling apparatus that enables a thermoformed object to be made, in particular a container, that is provided with a pleasing appearance.

Still another object is to provide a forming and labelling apparatus that enables a thermoformed container to be made that is provided with a spatula that is usable for drawing a product contained inside thermoformed container.

BRIEF DESCRIPTION OF THE FIGURES

The invention can be better understood and implemented with reference to the attached drawings that illustrate an embodiment thereof by way of non-limiting example, in which.

DETAILED DESCRIPTION

With reference to FIGS. 1 to 4, there is shown a forming and labelling apparatus 1 for making objects 2, in particular containers, by forming a sheet 3 of thermoformable material and for applying a label 4 to the aforesaid containers 2.

Figure 14:
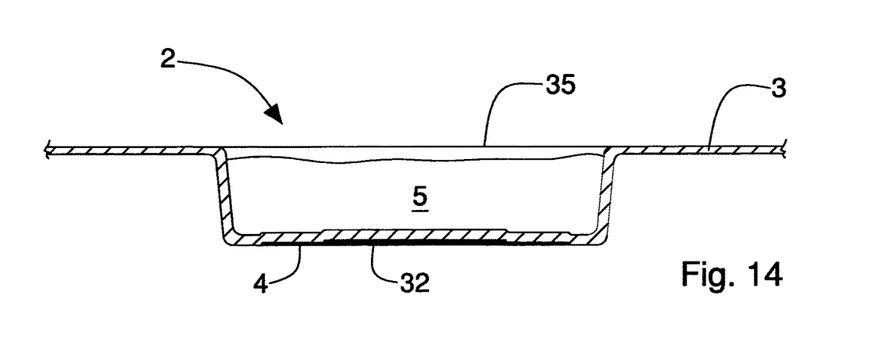
FIG. 14 is a cross section of the container in FIG. 10 once said container has been filled with a product and sealed with a covering film.

The apparatus 1 can be associated with a thermoforming machine, which is not shown, arranged for forming the containers 2 from the sheet 3. In particular, this machine includes a plurality of machining stations, amongst which a forming and labelling station with which the apparatus 1 is associated, and other stations preceding and subsequent thereto. For example, upstream of the forming station, a station is provided for heating the sheet 3 to high temperatures such as to enable the sheet to be softened and deformed in a plastic manner in the subsequent forming and labelling station. Further, downstream of the forming station there can be provided a station for filling the container 2 with a product 5 (shown in FIG. 14), a welding station in which a covering film 35 (shown in FIG. 14) is welded to the container 2 to seal the container 2, and a shearing station where a suitable shearing device separates the formed containers 2 from the sheet 3 from which they have been obtained.

The containers 2 and the labels 4 applied thereto are illustrated in FIGS. 6 to 14, which will be described in greater detail below.

The containers 2 and the labels 4 are respectively obtained by forming the sheet 3 and by shearing or detaching from a band 6 made, for example, of a thermally activatable material, in particular, a plastic material. Generally, the sheet 3 and the band 6 are unwound from respective reels at stations of the forming machine arranged upstream of the apparatus 1. In particular, the sheet 3 is advanced through the machining stations of the forming machine with which the apparatus 1 is associated according to a first advancement direction indicated in the figures by the arrow A.

The band 6 is in turn advanced through the apparatus 1 according to a second advancement direction indicated in FIGS. 6 to 9 by the arrow B, the second advancement direction B of the band 6 being for example transverse, in particular substantially orthogonal, to the first advancement direction A of the sheet 3. The sheet 3 and the band 6 are advanced along the respective advancement directions A, B according to an intermittent indexed motion at a substantially equal advancement speed.

The apparatus 1 comprises a bell 7 positioned above the sheet 3 and bounding a closed working zone 8, within which the container 2 is formed.

The apparatus 1 includes a forming arrangement 9, 10 and 11 arranged for forming the containers 2. In particular, the forming arrangement 9, 10 and 11 includes a punch 9 configured for cooperating with a die 10 in a shapingly coupled manner. The die 10 is provided with a supporting wall 12 (FIG. 1) that is substantially flat and configured for supporting, in a forming step, the sheet 3.

The punch 9, arranged in the working zone 8, is movable towards and away from the die 10 and engages with a cavity 13 of the die so as to deform the sheet 3. In particular, the punch 9 is movable towards the die 10 according to the direction defined by the arrow F1 in FIGS. 1, 2 and 3 and is movable away from the die 10 according to the direction defined by the arrow F2 in FIG. 4.

The bell 7 further comprises an abutting portion 19 arranged for pressing the sheet 3 and keeping the sheet 3 blocked against the supporting wall 12, in particular during the forming operation. The abutting portion 19, fixed to the remaining part of the bell 7 by fixing elements that are not shown, for example threaded screws, faces the die 10.

The abutting portion 19 is provided with a hole 20 positioned substantially above the cavity 13 and having overall plan-view dimensions that are greater than the cavity 13.

The cavity 13 is obtained in the supporting wall 12 and is arranged for receiving a portion 14 of the sheet 3 to be deformed during a forming step in order to obtain the container 2. It should thus be noted that the container 2, which is formed by the apparatus 1, will have a shape and dimensions defined by the cavity 13. The latter includes an opening facing the sheet 3 of material to be formed, a first wall 16, which forms the bottom wall of the cavity 13, and second walls 17, in particular side walls, which connects the first wall 16 to the supporting wall 12.

The cavity 13 can have any desired shape, such as depicted in the embodiment shown in the figures, the cavity 13 has a parallelepipedon shape and the second walls 17 includes tilted side walls.

In another embodiment, which is not shown, the side walls 17 can be substantially orthogonal to the first wall element 16 and/or to the supporting wall 12.

In alternative embodiments that are not shown, the cavity 13 can have, for example, a frustoconical or cylindrical or prismatic shape in function of the shape that the container 2 to be formed has to have.

The first wall 16 is movable between a first lowered operating position C1 (shown in FIGS. 1, 2 and 3) in which it receives a label 4, and a second raised operating position C2 (shown in FIG. 4) in which the first wall 16 cooperates with the adjacent side walls 17 to bound the cavity 13. In particular, in the first lowered operating position C1 the first wall 16 supports the band 6 from which the label 4 will be obtained, as explained better below.

The first wall 16 is associated with a further punch 22 arranged for separating the label 4 from the band 6, in particular by shearing. In other words, the first wall 16 forms the operating wall of the further punch 22 facing the cavity 13. The further punch 22 is movable towards the cavity 13 according to the direction defined by the arrow G1 in FIGS. 1, 2 and 3 and is movable away from the cavity 13 according to the direction defined by the arrow G2 in FIG. 4.

The further punch 22 is arranged in a lower part 23 of the apparatus 1 that further includes a blocking device 24 that is movable and intended for pressing the band 6 and keeping the band 6 pressed against a lower part of the die 10. The blocking device 24, for example configured as a plate, includes in particular an abutting wall 26 arranged for supporting and abutting on the band 6.

Figure 1:
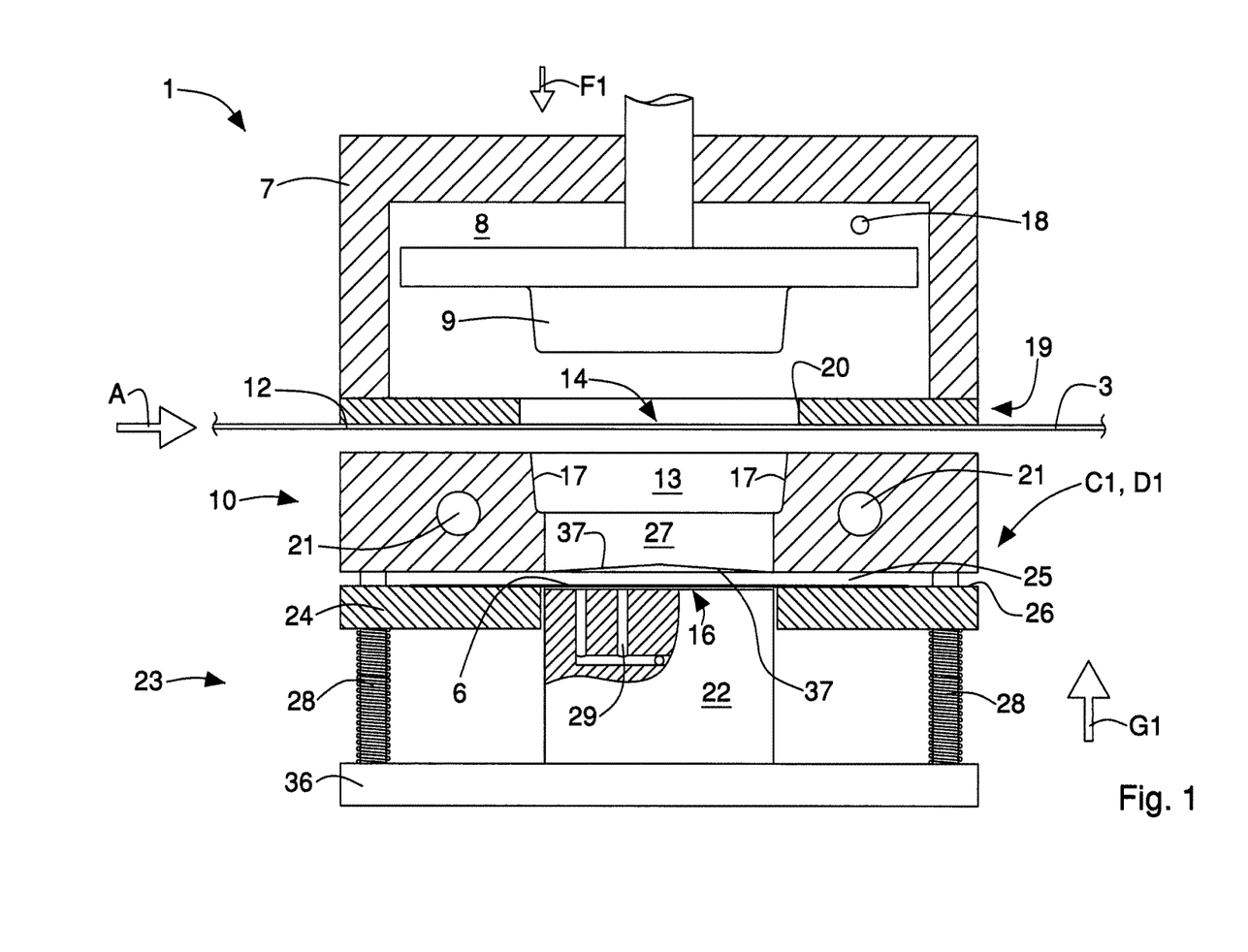
FIG. 1 is a schematic cross section of a forming and labelling apparatus according to the invention shown in a first operating configuration.
Figure 2:
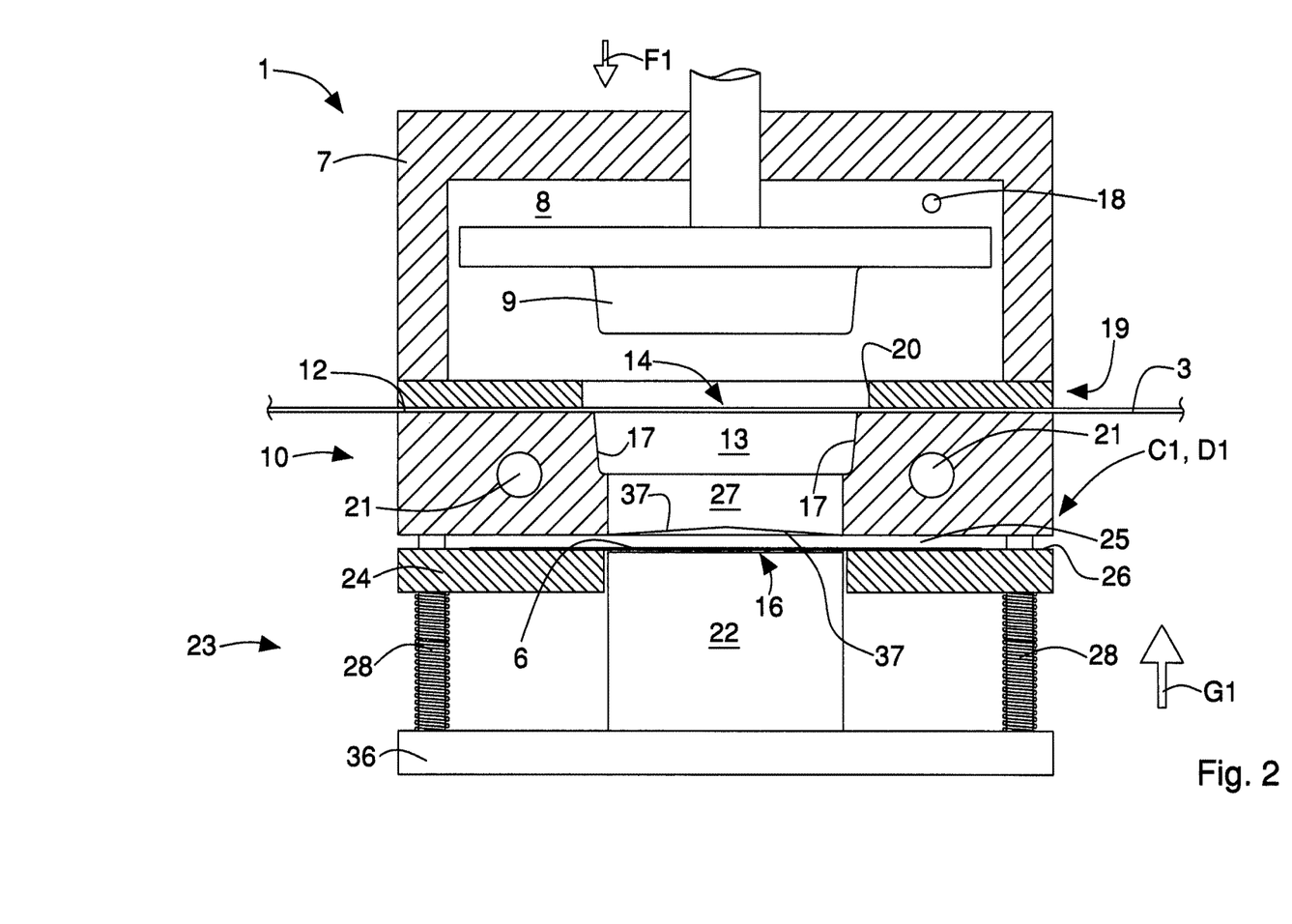
FIG. 2 is a schematic cross section of the apparatus in FIG. 1 shown in a second operating configuration.
Figure 3:
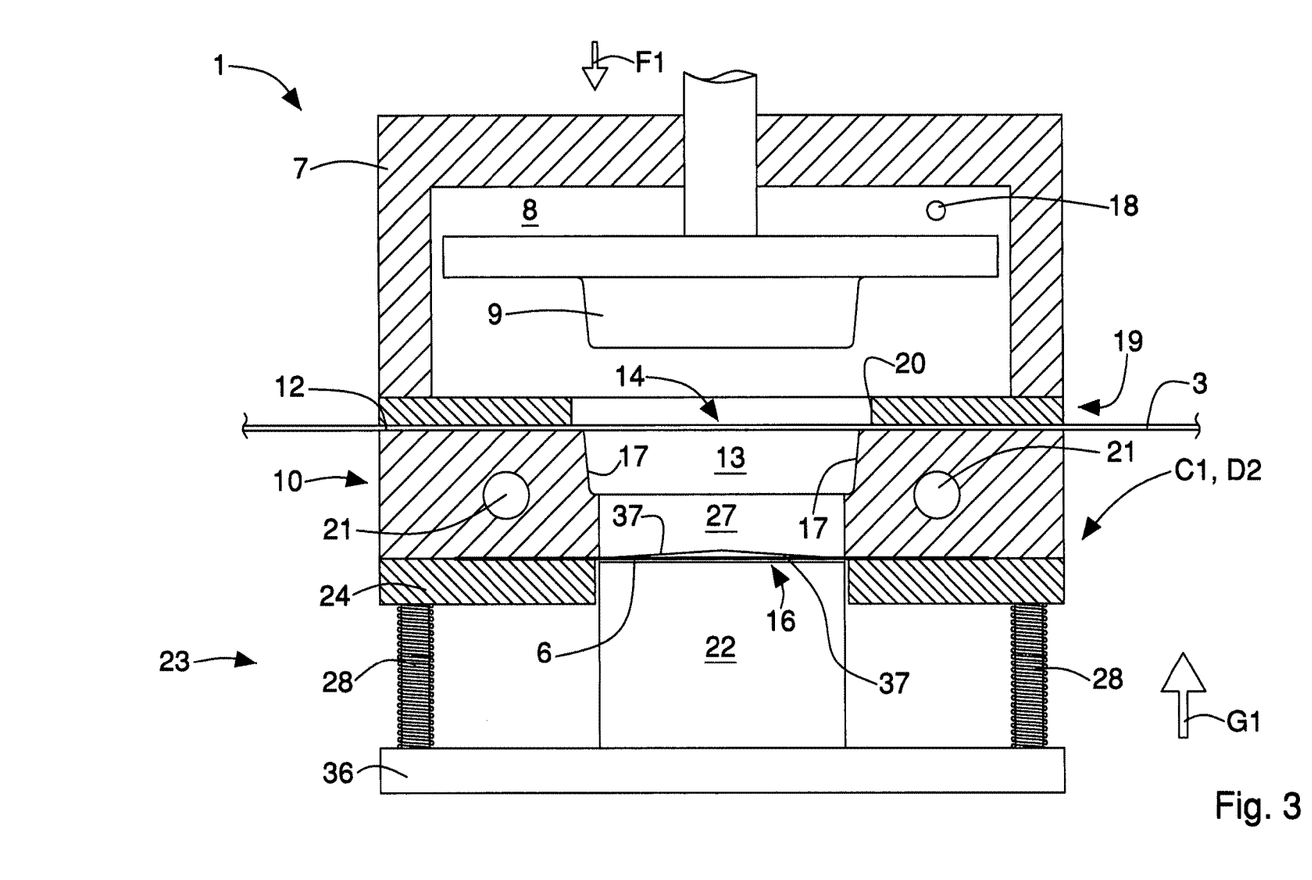
FIG. 3 is a schematic cross section of the apparatus in FIG. 1 shown in a third operating configuration.
Figures 4, 5:
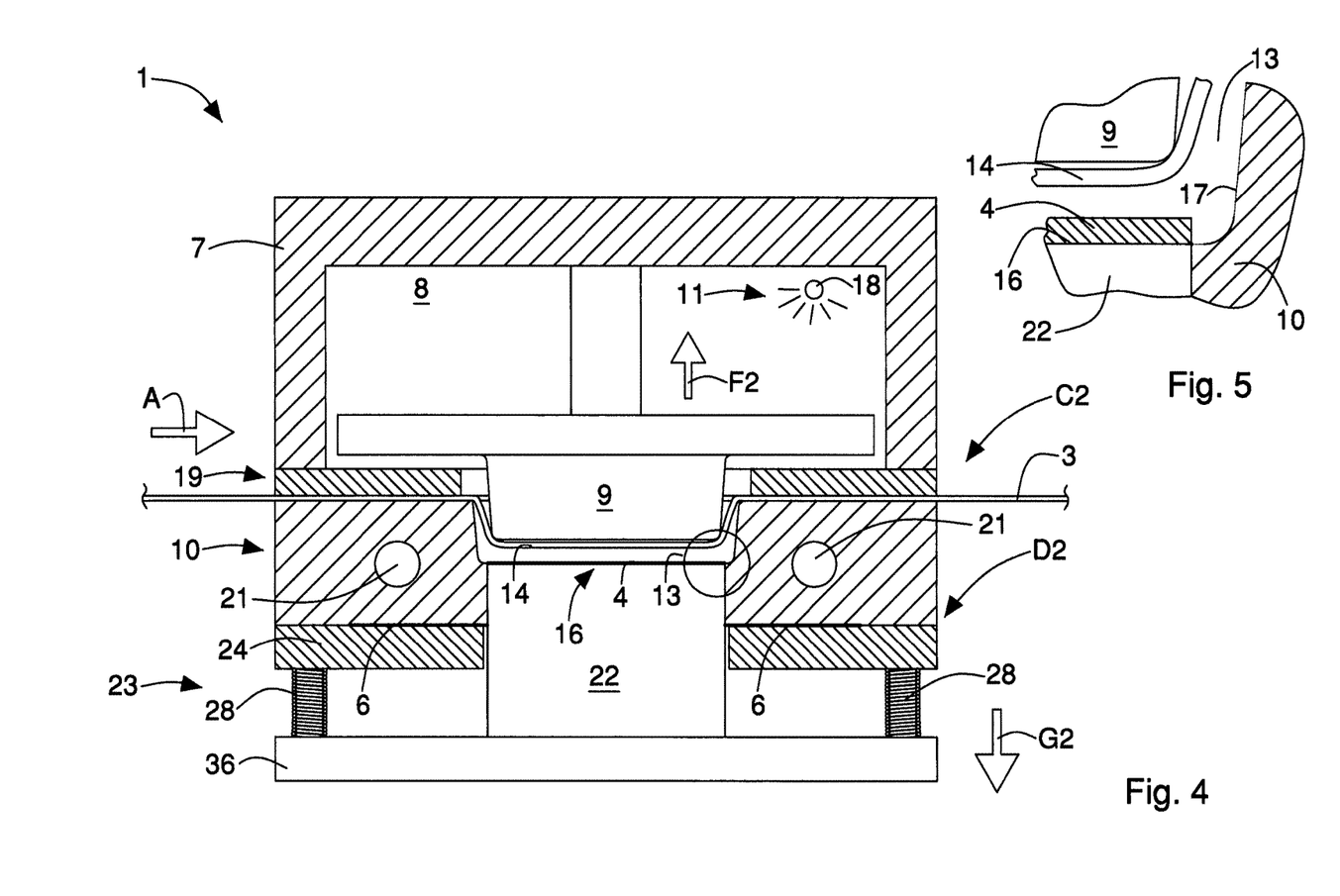
FIG. 4 is a schematic cross section of the apparatus in FIG. 1 shown in a fourth operating configuration.
FIG. 5 is an enlarged detail of FIG. 4.

The blocking device 24 is movable between a respective first operating position D1, shown in FIGS. 1 and 2, in which the abutting wall 26 is substantially aligned on the first wall element 16 arranged in the respective first operating position C1, such as to enable the band 6 to slide within a gap 25, and a respective second operating position D2, shown in FIGS. 3 and 4, in which the abutting wall 26 presses the band 6 and keeps the band 6 blocked against a lower part of the die 10. The gap 25 is defined between the die 10 and the blocking device 24, when the latter is in the first operating position D1. In other words, the blocking device 24 is lowered in the first operating position D1 and is raised in the second operating position D2 so as to contact the lower wall of the die 10, pressing the band 6 against the die and keeping the band 6 blocked against the die 10.

In FIG. 3, the blocking device 24 is thus in the respective second operating position D2 and the first wall 16 is in the respective first operating position C1.

In FIG. 4 the apparatus 1 is shown in a configuration in which the blocking device 24 is in the respective second operating position D2 and the first wall 16 is in the respective second operating position C2. In this configuration of the apparatus 1 the further punch 22 is raised and inserted inside a chamber 27, contained in the die 10 and connects the cavity 13 to the gap 25, to bound the cavity 13 in cooperation with the side walls 17. The chamber 27 is provided with a cutting arrangement 37 arranged for cutting the band 6 during the upward movement of the first wall 16. The cutting arrangement 37 includes a cutting edge associated with a peripheral edge of a mouth of the chamber 27 opposite the cavity 13. In other words, during upward movement of the latter from the first operating position C1 to the second operating position C2, the cutting arrangement 37 shears the band 6 to obtain the label 4.

It should be noted that in order to avoid tearing or lacerating the band 6, the number of cutting arrangements 37 is preferably greater than one so as to start to shear the band 6 simultaneously in several zones; in particular, for example, four blades can be provided that each start to cut the band from a respective zone corresponding to a peripheral portion of the label 4. In this case, the cutting elements will be provided with a set rake angle that enables the cut to be made gradually along the respective cutting line.

In an alternative embodiment of the apparatus, which is not illustrated in the figures, other blades are provided that are associated with the first wall of the further punch and arranged for cutting the band 6 in cooperation with the cutting arrangement 37 during upward movement.

In another embodiment of the invention, which is not shown, the apparatus 1 can be devoid of the cutting arrangement 37, as the label 4 is already formed on the band 6 entering the apparatus 1, for example being separable from the band 6 by means of intended breakage lines. In this case, the further punch 22, and the first wall 16 thereof, separate the label 4 from the band 6 during movement from the first operating configuration C1 to the second operating position C2, without performing any band 6 cutting operation.

The further punch 22 is moved by an elastic arrangement 28, in particular springs, provided with a high stiffness which is appropriate for the mass of the lower part 23 to be moved.

It should be further noted that the further punch 22 is provided with a plurality of suction channels 29 that are mutually connected and arranged for creating a vacuum at the first wall 16 that is able to retain the label 4, once the latter has been cut and separated from the band 6, on the first wall 16. The suction channels 29, as shown in the partial section view in FIG. 1, are connected on one side to a suction device (which is not shown), such as, for example, by a vacuum pump, and on the other side by leads onto the first wall 16.

In the configuration of the apparatus 1 shown in FIG. 4, while the punch 9 deforms the portion 14 of sheet 3, the first wall 16 supports and retains the label 4 such that the latter, during the subsequent forming step is substantially incorporated into a lower face 40 of the container 2. In this configuration, the first wall 16 in fact defines a bottom wall of the cavity 13, which is substantially parallel to the supporting wall 12, by bounding in this manner the cavity 13 on a side opposite the punch 9.

The forming arrangement 9, 10, 11 further includes pressurized air 11, introduced into the working zone 8, which is hermetically sealed, through a channel 18 obtained in the bell 7 to cooperate with the punch 9 in order to make the portion 14 of the sheet 3 adhere to the walls 16, 17.

In an alternative embodiment of the invention, which is not shown, the forming arrangement may include only one punch that engages in a corresponding die, but not pressurized air.

The die 10 is provided with conduits 21 within which a fluid flows that is suitable for cooling the die 10 and consequently the portion 14 of the sheet 3 deformed within the cavity 13 such as to give appropriate stiffness features to the container 2 once it has been formed.

The apparatus 1 is provided with a control unit, which is not shown, which enables advancement of the sheet 3 and of the band 6 to be controlled and coordinated with the movement of the punch 9 and of the further punch 22. This control unit may coincide, for example, with the control unit of the thermoforming machine with which the apparatus 1 is associated.

In use, the sheet 3 is heated in the heating station, which softens the sheet 3 and places the sheet in the best condition to be compression-formed in the subsequent forming station.

Subsequently, the heated sheet 3 and the band 6 made of a thermally activatable material are advanced by an intermittent indexed motion along respective advancement directions A, B to the apparatus 1.

In non-operating conditions, and while the sheet 3 and the band 6 are advancing, the apparatus 1 is arranged according to the configuration shown in FIG. 1, in which the mould is open to enable the sheet 5 to be advanced. In particular, the punch 9 is raised, and the die 10, together with the lower part 23, is spaced apart from the abutting portion 19. In this configuration, the first wall 16 is in the respective first operating position C1, and the blocking device 24 is in the respective first operating configuration D1.

When the sheet 3 is stationary, the die 10 is raised in such a manner as to contact the sheet 3 and keep the sheet 3 pressed against the abutting portion 19 (FIG. 2).

Subsequently, the further punch 22, and thus the first wall 16 are moved from the first operating position C1 to the second operating position C2, while the blocking device 24 is moved from the respective first operating position D1 to the respective second operating position D2, shown in FIGS. 3 and 4, in which the abutting wall 26 presses the band 6 and maintains the band 6 blocked against a lower wall of the die 10. In other words, the further punch 22 and the blocking device 24 are supported by a supporting plate 36 which is moved, by a known driving device that is not shown, along a vertical direction substantially parallel to the direction indicated by the arrows G1, G2. It should be noted that the further punch 22 is fixed to the supporting plate 36, while the blocking device 24 is connected thereto by the elastic arrangement 28.

It should further be noted that during upward movement of the first wall 16 from the first operating position C1 to the second operating position C2, the cutting arrangement 37 shears the band 6 to obtain the label 4. When the first wall 16 reaches the second operating position C2, the further punch 22 is raised and received inside the chamber 27 in such a manner that the first wall 16 (on which the label 4 rests and is retained by a vacuum) bounds the cavity 13 in cooperation with the side walls 17.

Subsequently, the punch 9 is lowered until it reaches a position shown in FIG. 4 in which the punch 9, by cooperating with the cavity 13 of the die 10, deforms the portion 14 of sheet 3 to form the container 2. During the descent of the punch 9, the latter, before being received in the cavity 13, passes through the hole 20 of the blocking device 24 and when it lowers below the supporting wall 12 it begins to deform the portion 14 of the sheet 3 in a plastic manner.

During the descent of the punch 9, pressurized air 11 (FIG. 4) can also be activated that is conducted by the channel 18 to the inside of the working zone 8 to cooperate with the punch 9 in the forming process. In particular, the pressurized air 11 cooperates with the punch 9 to improve adhesion of portion 14 of sheet 3 to the side walls 17 and to the first wall 16 when the latter are in the second operating position C2 (i.e., when the latter are raised).

FIG. 5 shows an enlarged detail of FIG. 4 in which the label 4 is visible and rests on the first wall 16 and is retained thereupon by the vacuum created by the suction channels 29. The label 4 is thus positioned inside the cavity 13 in such a manner that when the portion 14 of sheet 3 adheres to the walls of the cavity 13 to form the container 2, it incorporates the label 4. As the label 4 is thermally activatable, it is fixed stably and permanently to the container 2 owing to the high temperature of the sheet 3 from which the container 2 is formed.

Once the punch 9 has formed the container 2 and the label 4 has been fixed thereupon, the container 2 is cooled rapidly by the fluid that flows in the conduits 21 of the die, whilst the punch 9 is raised until it returns to the raised position of FIG. 1. At the end of cooling, the formed container 2 consolidates its shape, incorporates the label 4, for example substantially at a for example lower face 40 of the container 2 opposite that one to which the covering film 35 will be applied.

Figure 11:
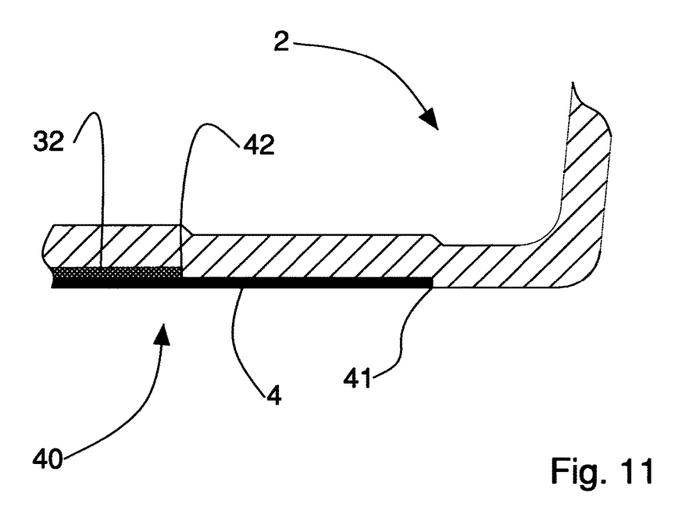
FIG. 11 is an enlarged detail of FIG. 10.
Figure 12:
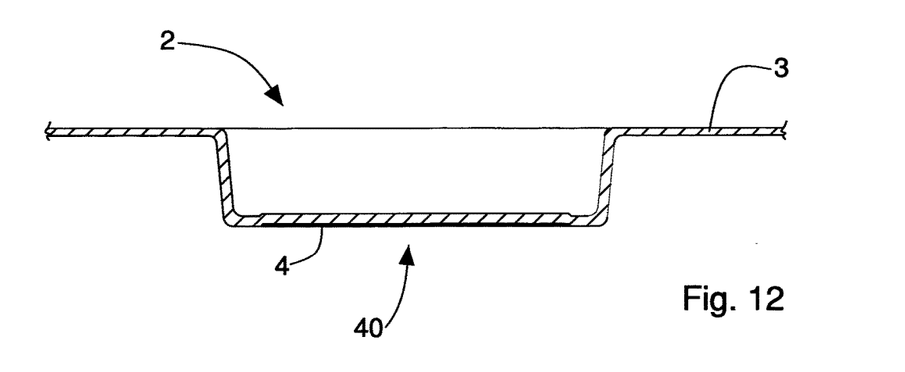
FIG. 12 is a cross section of a container thermoformed by the apparatus in FIG. 1, according to the line of section XII-XII of FIG. 6.
Figure 13:
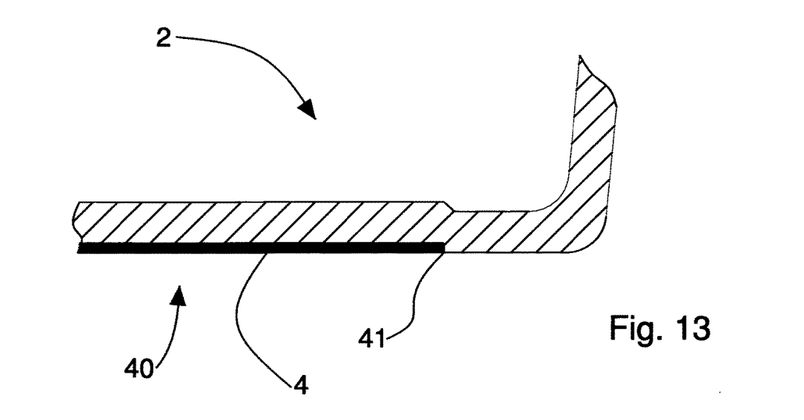
FIG. 13 is an enlarged detail of FIG. 12.

As shown better in the enlarged details of FIGS. 11 and 13, the aforesaid lower face 40 comprises a recess 41, of a height that is substantially equal to the thickness of the label 4, within which the label 4 is received and fixed. Subsequently, it is possible to move the die 10 away from the abutting portion 19, together with the lower portion 23 of the apparatus 1, in a substantially vertical direction and downwards, so that the sheet 3 on which the container 2 provided with a label 4 has been formed can proceed to any subsequent machining stations of the forming machine with which the apparatus 1 is associated.

Figure 6:
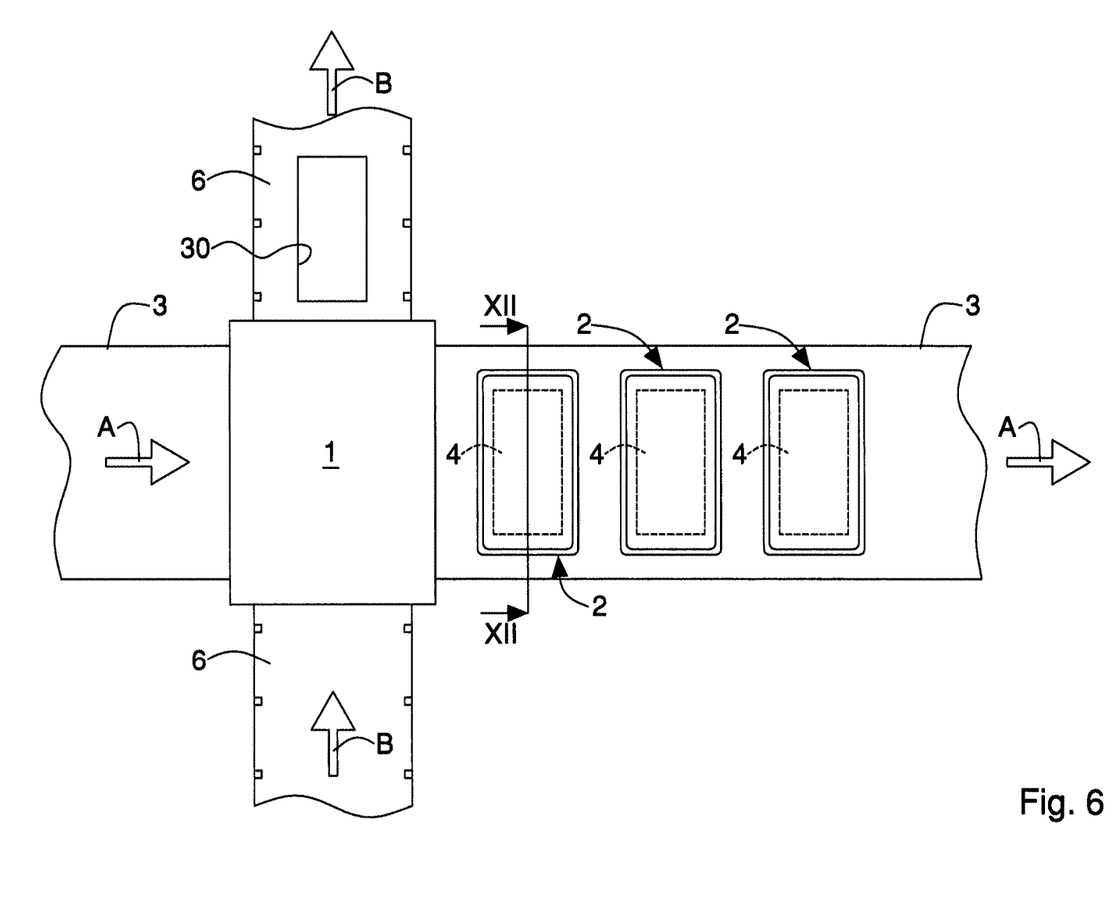
FIG. 6 is a schematic plan view of the apparatus in FIG. 1 in which a sheet of thermoformable material and a band for labels are visible.

With reference to FIG. 6, a plan view of the machining station is shown with which the apparatus 1 is associated. In particular, in addition to the apparatus 1, the sheet 3 and the band 6 are shown that are advanced towards the apparatus (respectively along the advancement directions A, B) and exit therefrom after the apparatus 1 has formed the container 2 and applied the label 4 to the apparatus 1.

The band 6 exiting the apparatus 1 constitutes machining sprue and an opening 30 is visible thereupon that is devoid of material where the cutting arrangement 37 has shorn the band 6 to obtain the corresponding label 4.

On the sheet 3 exiting the apparatus 1 a plurality of formed containers 2 are visible (which are visible in greater detail in FIGS. 12 and 13), to which the label 4 has been applied that is shown by a dashed line.

Figure 7:
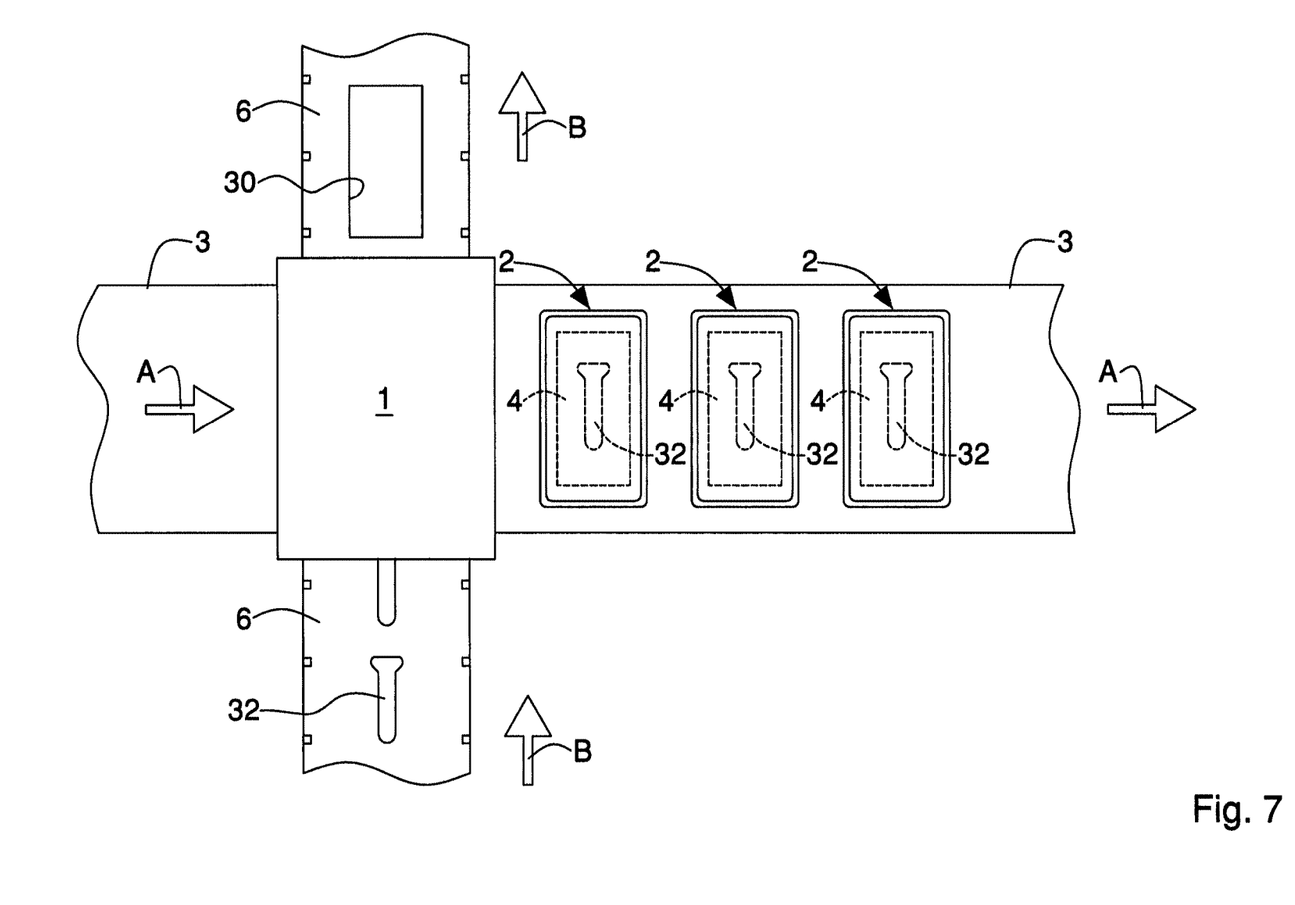
FIG. 7 is a schematic plan view of the apparatus in FIG. 1 in which there are shown the sheet and the band of FIG. 6 in a first embodiment.
Figure 8:
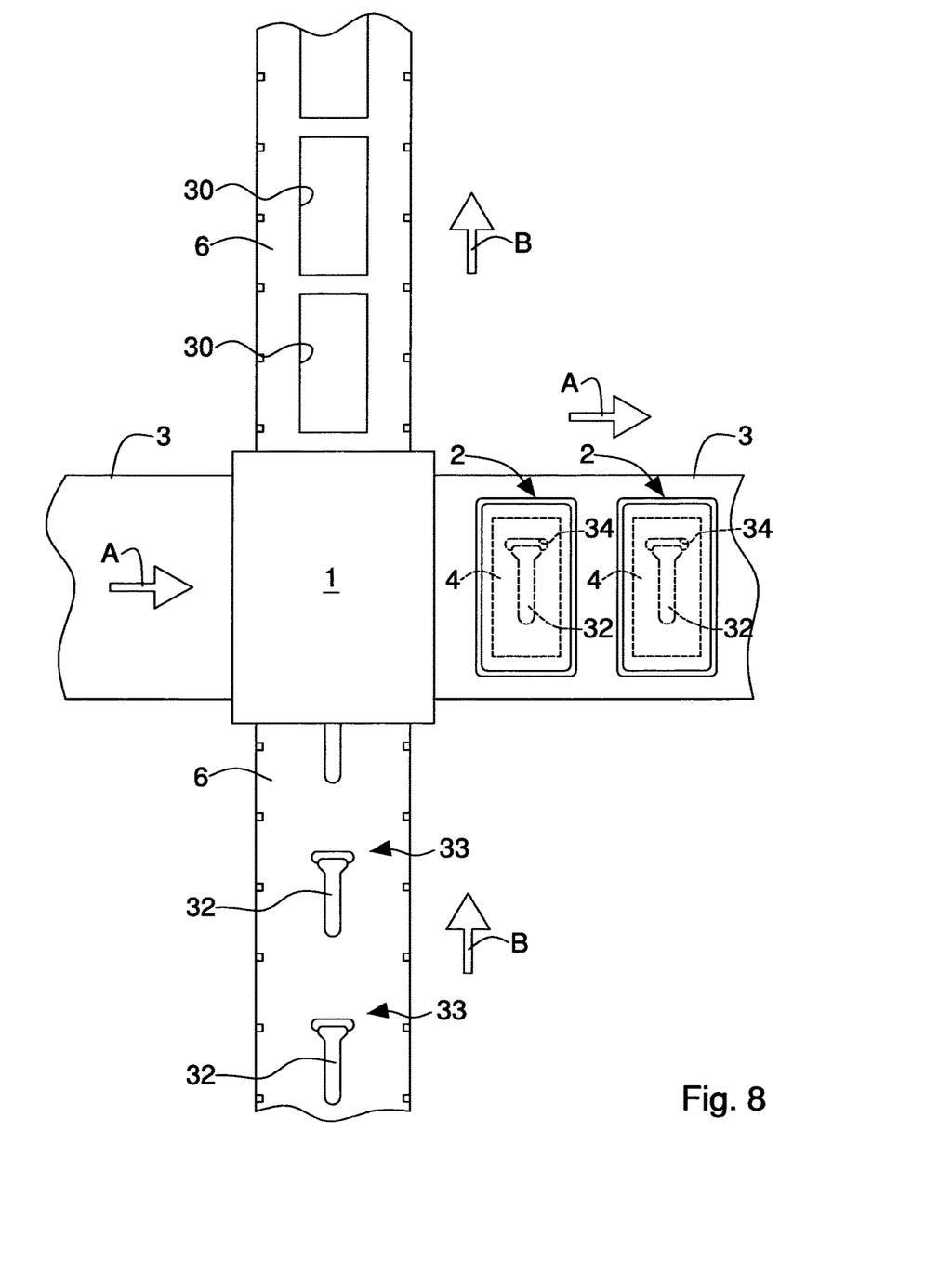
FIG. 8 is a schematic plan view of the apparatus in FIG. 1 in which there are shown the sheet and the band of FIG. 6 in a second embodiment.
Figure 9:
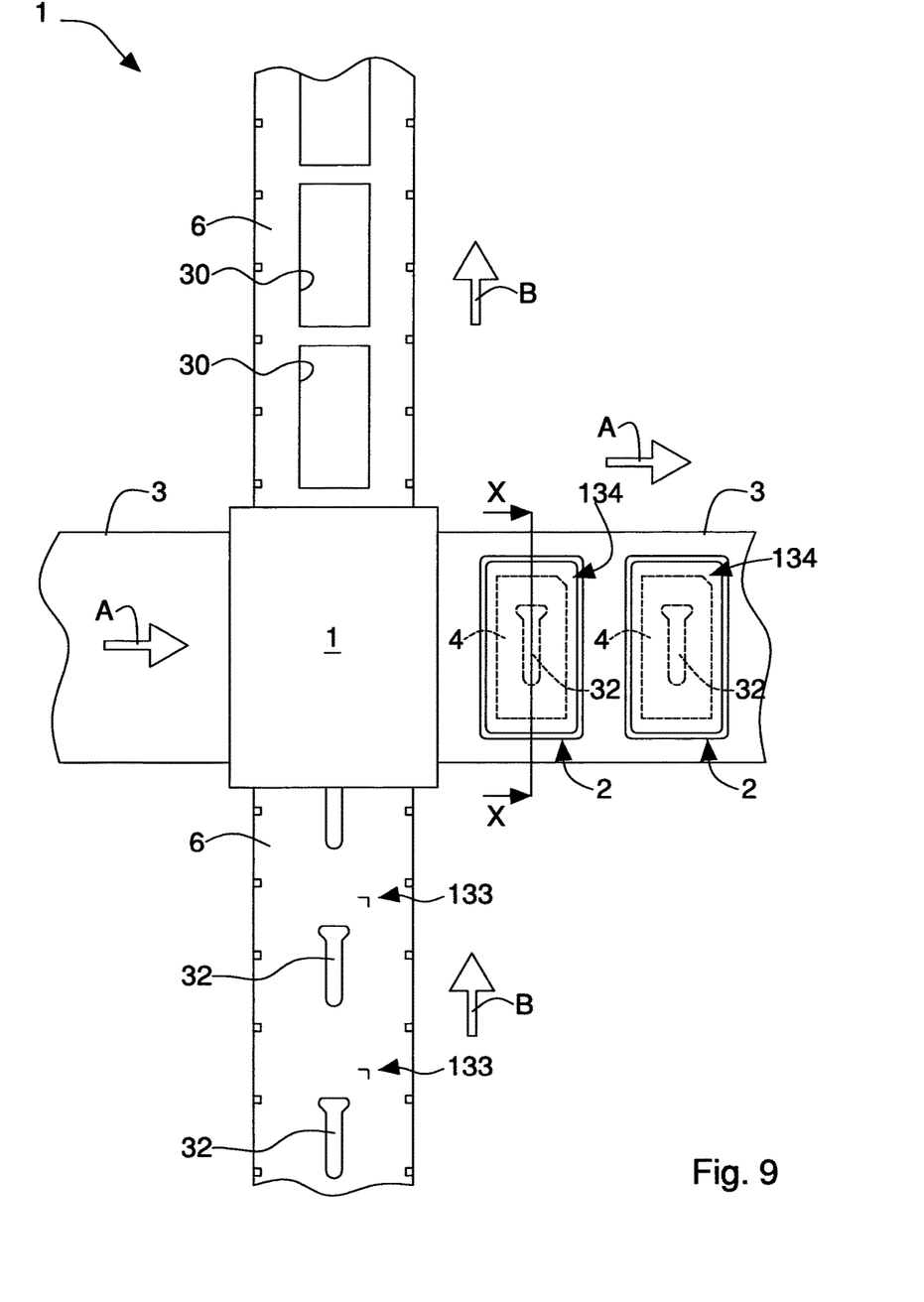
FIG. 9 is a schematic top plan view of the apparatus in FIG. 1 in which there are shown the sheet and the band of FIG. 6 in a third embodiment.

With reference to FIGS. 7 to 9, there are shown some operating versions of the apparatus 1, which is structurally and functionally similar to that of FIG. 6.

In these figures, a spatula 32 is shown that is associated with the band 6, which a user can use to draw a product 5 dosed in the container 2 after thermoforming thereof. The spatula 32 is already arranged on the band 6 regularly separated from one another by a distance that is substantially the same as that by which the band 6 is advanced at each step. In other words, the spatula 32 is located in a position that is substantially centred with respect to the label 4 with which it will be associated and which will be obtained by shearing the band 6.

Figure 10:
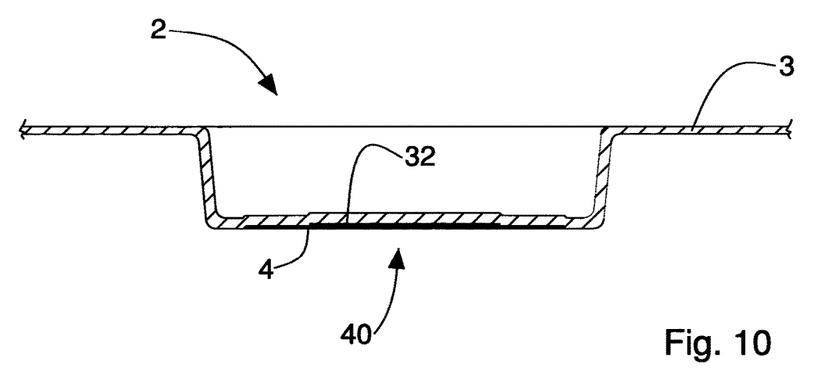
FIG. 10 is a cross section of a container thermoformed by the apparatus in FIG. 1, according to the line of section X-X of FIG. 9.

As shown in FIGS. 10 and 11, the spatula 32 is interposed between the surface of the container 2 to which the label 4 is applied, and the label 4. Even when the spatula 32 is associated with the band 6 and therefore with each label 4, the operation of the forming and labeling apparatus is similar to what is disclosed above, with the only difference being that the portion 14 of the sheet 3 that will form the container 2 during its cooling, incorporates both the label 4, and the spatula 32 (the latter, like the labels 4, is shown by a dashed line in FIGS. 7 to 9).

Similarly to the label 4, the spatula 32 is received inside a further recess 42 made in the lower face 40 of the container 2.

In order to grasp the spatula 32, the user removes the label 4, at least partially, from the lower face 40.

It is important to observe that before use the label 4 completely protects the spatula 32 from dirt, dust, etc or from any other type of external agent that could make use thereof unhygienic.

With reference to FIGS. 8 and 9, pre-cuts 33, 133 are visible that have been made on the band 6 by a suitable further cutting arrangement that is not shown and define windows 34 or tabs 134 on the label 4 that are suitable for allowing a user to more easily remove the spatula 32.

In FIG. 8 the pre-cuts 33, which have, for example, the shape of ellipses, are made at an end of the spatula 32 in such a manner as to a define a portion of the label 4, which is liftable to enable a user to remove the spatula 32.

Alternatively, the pre-cuts 33 can define a window 34 or an opening of the label 4 that does not completely cover the spatula 32, which in particular leaves the end of the latter uncovered.

In alternative embodiments that are not shown, the pre-cuts 33 can have any desired shape other than an elliptic shape.

In another embodiment, which is not shown, the pre-cuts 33 can be made at a further end of the spatula 32 opposite the aforementioned end.

In the version illustrated in FIG. 9, pre-cuts 133 are shown, for example "L"-shaped pre-cuts 133, and a further cutting arrangement is made at zones of the band 6 that are intended to become one of the four angular zones of a label 4. In this manner, during the forming process, in the angular zone in which the pre-cut 133 is made, a tab 134 will be formed by an arrangement which will allow the user to be able to detach the label 4 easily from the container 2 to remove the spatula 32. In other words, as a result of the tab 134, the label 4 is easily 'peelable' by the user but, before use, the label 4 also continues to protect the spatula 32, which is intended for entering into contact with the product 5, from dirt, dust, etc.

The forming and labelling apparatus 1 according to the invention enables various advantages to be obtained.

An advantage of the apparatus 1 is that it enables a forming machine to which it is associated to be cheaper. This is due to the fact that such a machine does not require a labelling apparatus, as occurs on the other hand with machines of known type.

Another advantage of the apparatus 1 is that it is structurally and functionally simple, and thus relatively cheap. Thus the apparatus 1, which combines forming and labelling, is less expensive than the total of the single costs of a known forming apparatus and of a known labelling machine.

A further advantage is that the apparatus 1 enables the label 4 to be positioned precisely and correctly on a lower face 40 of the container 2, as forming the latter and applying the label 4 are substantially simultaneous operations that are performed by the same apparatus 1 without movement of the sheet 3.

Still another advantage of the apparatus 1 is that of forming containers 2, provided with a label 4, provided with a pleasant aesthetic appearance.

This is owing to the fact that the label 4 is no longer in relief with respect to the surface of the known containers 2 but is instead incorporated inside a respective recess 41. Applying the label 4 to the heated and softened sheet enables the label 4 to be fixed more firmly and effectively compared with the prior art, thus avoiding the using of any type of glue, the use of which increases both the operating costs of the apparatus, and the problems of residues on the containers and on the parts and components of the machine.

Still another advantage of the apparatus 1 is that it is very flexible, it being able to be used without any structural or functional modification even if, in addition to the label 4, it is desired to associate with the container 2 also a spatula 32. While maintaining the aforementioned other advantages, this enables the container 2 to be provided with an element through which the user can remove the product 5 from the inside of the container. The spatula 32 is hygienic and clean because it is protected before use by the label 4. Further, the apparatus 1 is able to make different types of pre-cuts 33, 133 on the band 6, which enable windows 34 or tabs 134 to be obtained to facilitate the removal of the spatula 32 by the user.

In versions of the invention that are not shown the apparatus may comprise a plurality of punches, possibly arranged on several rows, provided that they are provided with a corresponding die (provided with a cavity with which the punch engages in a shapingly coupled manner to deform the sheet 3) in a plastic manner, and corresponding further punches for separating the label 4 from the band 6.

In another version, which is not shown, the apparatus 1 can apply labels of any shape and dimensions, also labels of a different shape from the rectangular shape illustrated; the further punch having to be consequently suitably sized and shaped in function of the desired shape and dimensions of the label.

In still another version, which is not shown, the punch 9 can be replaced by other punch means.

Variations and/or additions to what has been disclosed and/or shown in the attached drawings are possible.

The invention claimed is:

1. An apparatus for forming and labelling objects, comprising
   (a) a forming device including
      (1) a die including side walls which define an upper cavity and a bottom wall, said die bottom wall further containing a lower chamber communicating with said upper cavity;
      (2) a first punch operable between a first position wherein said first punch is above said upper cavity and a second position wherein said first punch is arranged within said upper cavity;
      (3) a second punch connected with a supporting plate and operable between a first position below said lower chamber and a second position wherein said second punch is arranged within said lower chamber, said second punch including an upper surface which defines a bottom wall of said first cavity opposite said first punch when said first and second punches are in said second positions, respectively;
   (b) a blocking device arranged beneath said die and operable between a first position where said blocking device is spaced from said die bottom wall and a second position where an abutting wall of said blocking device is pressed against said die bottom wall; and
   (c) elastic devices connecting said blocking device with said supporting plate, wherein when said first and second punches are in said first positions, respectively, a sheet of thermoformable material is arranged between said first and second punches above said upper cavity, and a band is arranged between said blocking abutting wall and said die bottom wall, an object is formed from said sheet of thermoformable material and a label is separated from the band and bonded to a bottom surface of the object when said first punch is displaced to said second position and said second punch and said blocking device are displaced to said second positions, respectively.

2. An apparatus according to claim 1, wherein said second punch comprises a conduit connected on one side to an air suction device, and on the other side leading onto said bottom wall so as to create a vacuum for retaining said label on said bottom wall.

3. An apparatus according to claim 1, and further comprising a cutting device associated with said lower chamber for cutting said band and obtaining said label when said bottom wall is moved from said first position to said second position.

4. An apparatus according to claim 1, wherein said label is pre-cut on said band and said bottom wall separates and lifts said label from said band during movement of said second punch from said first position to said second position.

5. An apparatus according to claim 1, and further comprising an advancement device for advancing said sheet and said band with an intermittent indexed motion along a first advancement direction and a second advancement direction, respectively, said first advancement direction and said second advancement direction being mutually transverse.

6. An apparatus according to claim 1, wherein said band contains a plurality of pre-cuts for promoting at least partial detachment of a plurality of said labels when said labels have been applied and fixed to respective objects.

* * * * *